United States Patent [19]

Walker et al.

[11] 4,425,463

[45] Jan. 10, 1984

[54] DRILLING FLUIDS BASED ON A MIXTURE OF SULFONATED THERMOPLASTIC POLYMER AND AN AMINE-TREATED CLAY

[75] Inventors: Thad O. Walker, Humble, Tex.; S. Richard Turner; Robert D. Lundberg, both of Bridgewater, N.J.; Warren A. Thaler, Aberdeen, N.J.; Dennis G. Pfeiffer, East Brunswick, N.J.

[73] Assignee: Exxon Research and Engineering Co., Florham Park, N.J.

[21] Appl. No.: 416,934

[22] Filed: Sep. 13, 1982

[51] Int. Cl.$^3$ .......................... C08K 3/24; C08K 3/34; C08L 25/08; C09K 7/02
[52] U.S. Cl. .................. 524/400; 252/8.5 C; 252/8.5 M; 252/8.5 A; 524/423; 524/445; 524/577; 524/578
[58] Field of Search ............. 252/8.5 M, 8.5 C, 8.5 A; 524/400, 423, 445, 577, 578

[56] References Cited

U.S. PATENT DOCUMENTS

| | | | |
|---|---|---|---|
| 2,217,927 | 10/1940 | Van Campen | 252/8.5 M |
| 2,599,683 | 6/1952 | Abrams et al. | 252/8.5 M |
| 2,801,967 | 8/1957 | Wilson | 252/8.5 M |
| 3,109,847 | 11/1963 | Shaler et al. | 252/8.5 M |
| 3,210,274 | 10/1965 | Caruso | 252/8.5 M |
| 3,222,278 | 12/1965 | Harryman et al. | 252/8.5 A |
| 3,622,513 | 11/1971 | Miller | 252/8.5 M |
| 3,870,841 | 3/1975 | Makowski et al. | 524/314 |
| 3,912,683 | 10/1975 | O'Farrell | 524/574 |
| 4,007,149 | 2/1977 | Burton et al. | 524/574 |
| 4,118,360 | 10/1978 | Makowski et al. | 524/574 |

FOREIGN PATENT DOCUMENTS 682553 10/1979 U.S.S.R. ..................... 252/8.5 M

OTHER PUBLICATIONS

International Publication Number WO81/00850, Published Under the Patent Cooperation Treaty (PCT), Apr. 2, 1981, 44 pp. spec., 5 pp. drawings, pp. 1–15.

*Primary Examiner*—Ronald W. Griffin
*Attorney, Agent, or Firm*—Richard E. Nanfeldt

[57] ABSTRACT

The present invention relates to mixtures of sulfonated thermoplastic polymers and amine-treated clays which function as viscosification agents when added to oil-based drilling muds which are the fluids used to maintain pressure, cool drill bits and lift cuttings from the holes in the drilling operation for oil and gas wells. The sulfonated thermoplastic polymers have about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic polymer in the oil drilling mud by decreasing the strong ionic interactions between the sulfonate groups of the sulfonated polymer.

18 Claims, 2 Drawing Figures

DRILLING FLUIDS BASED ON A MIXTURE OF SULFONATED THERMOPLASTIC POLYMER AND AN AMINE-TREATED CLAY

FIELD OF THE INVENTION

The present invention relates to mixtures of sulfonated thermoplastic polymers and amine-treated clays which function as viscosification agents when added to oil-based drilling muds which are the fluids used to maintain pressure, cool drill bits and lift cuttings from the holes in the drilling operation for oil and gas wells. The sulfonated thermoplastic polymers have about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic polymer in the oil drilling mud by decreasing the strong ionic interactions between the sulfonate groups of the sulfonated polymer.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or amine-treated clays (also a viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has heretofore not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formations. Past experience has shown that oil-based drilling fluids can provide good performance in water sensitive formations, and the state of the art systems can perform well up to about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need; therefore, for drilling fluids which can maintain their viscosity and gel strength at temperatures up to and exceeding 400° F. These needs are not adequately met by the current drilling fluids, even with the oil-based drilling muds often employed.

This invention describes an approach to viscosification of oil-based drilling muds which permits the substitution of sulfonated ionomers for asbestos fines. The resulting polymer-modified drilling muds display viscosities which are in a desirable range for drilling mud applications, good viscosities at retention, after aging and gel strength, from room temperature up to temperatures of 400° F. and higher, based on tests conducted for 16 hours at such temperatures.

It has also been shown that sulfonated polystyrene is very effective as a viscosifier for oil-based drilling muds at elevated temperatures, as described in copending application Ser. No. 292,333 entitled, "High Temperature Drilling Fluids Based on Sulfonated Thermoplastic Polymers". However, these formulas, as envisioned in Ser. No. 292,333, provide low gel strengths at room temperature to 150° F. and are not effective until thermally activated. We have found that sulfonated EPDM provides good viscosification at temperatures of about 300° F. and below when formulated in a mud based on fresh water. Higher temperatures (350° to 400° F.) encountered in accelerated aging studies for 16 hours have shown that sulfonated EPDM loses its efficacy almost completely at those higher temperatures.

It appears that until now, there has been no viscosifier which is effective at both room temperature and at 400° F. for the typical aging period of 16 hours. The instant invention will describe materials that provide excellent gel strength at both room temperature and at temperatures around 400° F. and at even higher temperatures.

The preferred thermoplastic species of the instant invention is a lightly sulfonated polystyrene with a sulfonate level of about 5 to about 100 meq. of sulfonate groups per 100 grams of sulfonated polymer which is used in combination with an amine-treated clay. It is believed that this polymer is not soluble in either the hydrocarbon phase or the aqueous phase of a formulated mud and; therefore, the polymer is probably located at the interface. As a consequence, this polymer is an extremely effective viscosifier even at quite low levels.

A second facet of the instant invention relates to the use of these materials in formations which employ high concentrations of salt in the aqueous phase. The mixture of amine-treated clay and sulfonated polystyrenes (SPS), which are the preferred embodiments of this invention, lose some of their efficacy in salt water. It has been found that the combination of a suitable non-ionic emulsifier with the sulfonated polymer and amine-treated clay gives formulations which are effective with salt water. Therefore, these systems give formulations which perform well at high temperatures and in the presence of salt water phases, which is a highly desired objective in the drilling fluids industry.

SUMMARY OF THE INVENTION

The present invention relates to mixtures of sulfonated thermoplastic polymers and amine-treated clays which, in combination, extend the useful operating range and function as viscosification agents when added to oil-based drilling muds which are the fluids used to maintain pressure, cool drill bits and lift cuttings from the holes in the drilling operation for oil and gas wells. The sulfonated thermoplastic polymers have about 5 to about 100 meq. of sulfonate groups per 100 grams of the sulfonated thermoplastic polymer, wherein the sulfonated groups are neutralized with a metallic cation or an amine or ammonium counterion. A polar cosolvent can optionally be added to the mixture of oil drilling mud and sulfonated thermoplastic polymer, wherein the polar cosolvent increases the solubility of the sulfonated thermoplastic polymer in the oil drilling mud by decreasing the strong ionic interactions between the sulfonate groups of the sulfonated polymer.

GENERAL DESCRIPTION OF THE INVENTION

Figure 1:
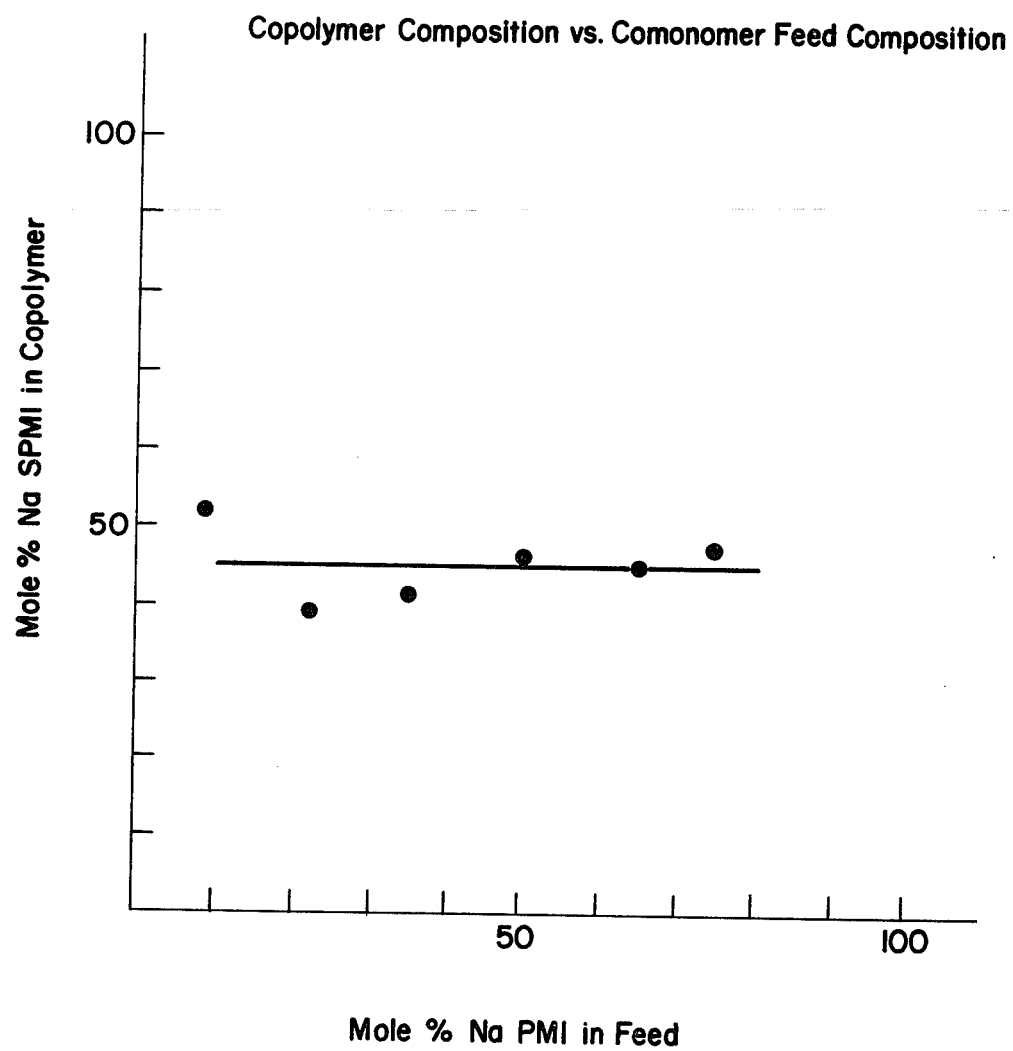
FIG. 1 shows copolymer composition vs. comonomer feed composition.
Figure 2:
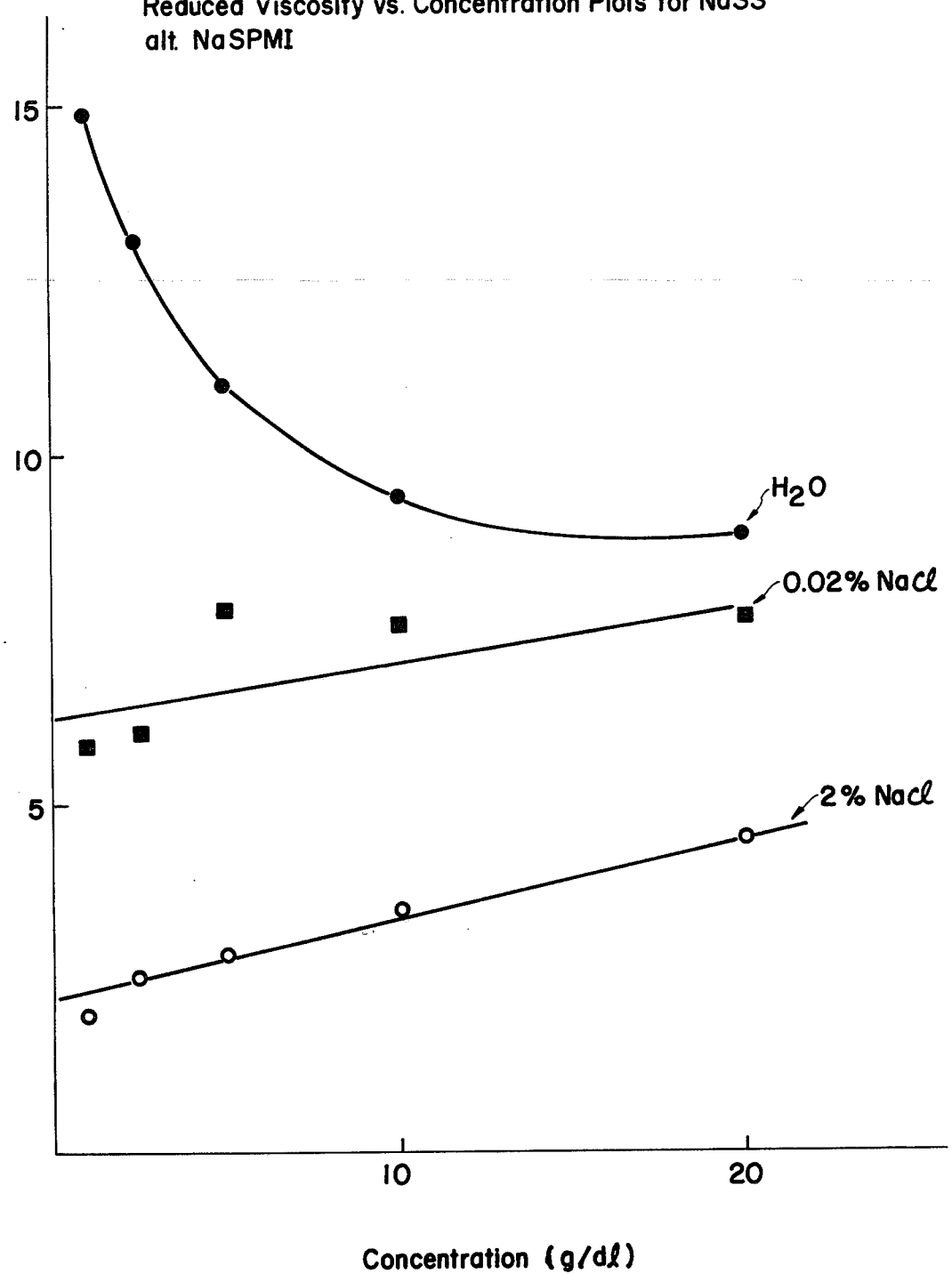
FIG. 2 shows reduced viscosity vs. concentration plots for sodium styrene sulfonate (NaSS) alt. NaSPMI.

The present invention describes a new class of viscosification agents for oil-based drilling muds which are used during operation of gas and oil wells, wherein these viscosification agents are mixtures of the amine-treated clay and sulfonated thermoplastic polymers. The oil-based drilling muds of the instant invention minimally comprise, but can also include other additives; an organic liquid such as an oil, fresh water or salt water, an emulsifier, a wetting agent, a weighting material and a mixture of the amine-treated clay and the sulfonated thermoplastic polymers. In general, the oil-based drilling mud has a specific gravity of about 7 pounds per gallon to about 20 pounds per gallon, more preferably, about 10 to about 16, most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent; and weighting material (barium sulfate or barite) necessary to give the desired mud density, which comprises less than about 800 lb/bbl. of barium sulfate, more preferably about 5 to about 750, and most preferably about 10 to about 700; about 0.25 to about 4 lb/bbl. of the sulfonated thermoplastic polymers; and about 1 to about 10 lb/bbl. of the amine-treated clay.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkyl-aryl sulfonate.

Typical, but non-limiting examples of a weighting material which can be readily employed is barite or a barium sulfate which may optionally be surface-treated with other cations, such as calcium.

The neutralized sulfonated thermoplastic polymers employed in the oil-based drilling muds are derived from polystyrene-type thermoplastic polymers which are selected from the group consisting essentially of polystyrene, poly-t-butyl-styrene, polychlorostyrene, polyalpha methyl styrene or co- or terpolymers of the aforementioned, with acrylonitrile or vinyl toluene.

While sulfonated thermoplastics are the preferred form of this invention, there are a large number of sulfonate-containing polymers which fall within the scope of this invention. These are described in U.S. Pat. Nos. 3,870,841 and 3,931,021, which are hereby incorporated by reference. Such polymers can be prepared by direct sulfonation of the preformed polymer or by copolymerization with a sulfonate-containing monomer. Particularly desirable polymers are those derived from vinyl monomer or comonomer, except propylene.

The polystyrene thermoplastics suitable for use in the practice of the invention have a glass transition temperature from about 70° C. to about 150° C., more preferably about 90° C. to about 140° C. and most preferably about 90° C. to about 120° C. These polystyrene resins have a weight average molecular weight as measured by GPC of about 5,000 to about 500,000 more preferably about 20,000 to about 350,000 and most preferably about 90,000 to about 300,000. These base polystyrene thermoplastic resins can be prepared directly by any of the known polymerization processes. The term "thermoplastic" is used in its conventional sense to mean a substantially rigid (flexural modulus >10,000 psi) material capable of retaining the ability to flow at elevated temperatures for relatively long times.

The preferred polystyrene thermoplastic resin is a homopolymer of styrene having a number average molecular weight of about 180,000 and an intrinsic viscosity in toluene of about 0.8. These polymers are widely available commercially in large volume. A suitable material is Styron 666, manufactured by Dow Chemical Co., which affords a suitable number average molecular weight of about 105,000.

The thermoplastic polymers are sulfonated by a process in a non-reactive solvent such as a chlorinated aliphatic solvent, chlorinated aromatic hydrocarbon, or an aliphatic hydrocarbon such as carbon tetrachloride, dichloroethane or chlorobenzene. The preferred solvents are the lower boiling chlorinated hydrocarbons. A sulfonating agent is added to the solution of the polymer and a non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, herein incorporated by reference. These sulfonating agents are selected from an acyl sulfate, a mixture of sulfuric acid and an acid anhydride or a complex of sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiopene or triethyl phosphate. The most preferred sulfonation agent for this invention is an acyl sulfate selected from the group consisting of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated thermoplastic polymer has about 5 to about 100 meq. sulfonate groups per 100 grams of sulfonated polymer, more preferably about 8 to about 60; and most preferably about 10 to about 45. The range of sulfonate content which can be considered does vary over an extremely broad latitude; however, it has been observed that in those systems of high sulfonation level, there is great difficulty in dissolving the sulfonated polymers and there can be very adverse effects in terms of the interaction of the sulfonated polymer with the barite weighting agent and with the other components of the drilling mud. Therefore, there is clearly an optimum level of sulfonation content which may vary from one sulfonated backbone to another, but for sulfonated polystyrene, it is in the most preferred embodiment of the invention as described above. The meq. of sulfonate groups per 100 grams of sulfonated thermoplastic polymer is determined by both titration of the polymeric sulfonate acid and Dietert Sulfur analysis. In the titration of the unneutralized sulfonate, the polymer is dissolved in solvent consisting of 95 parts by volume of toluene and 5 parts by volume of methanol at a concentration level of 50 grams per liter of solvent. The unneutralized sulfonate is titrated with ethanolic sodium hydroxide to an Alizarin-Thymolphthalein end-point.

The unneutralized sulfonated thermoplastic polymer is gel-free and hydrolytically stable. Gel is measured by stirring a given weight of polymer in a solvent comprised of 95 toluene-5-methanol to 90/10, at a concentration of 5 weight percent for 24 hours, allowing the mixture to settle, withdrawing a weighted sample of the supernatant solution and evaporating to dryness.

Hydrolytically stable means that the unneutralized sulfonate will not be eliminated under neutral or slightly basic conditions to a neutral moiety which is incapable of being converted to highly ionic functionality.

Neutralization of the unneutralized sulfonate groups of the sulfonated thermoplastic polymer is done by the addition of a solution of a basic salt to the unneutralized sulfonated thermoplastic polymer dissolved in the mixture of the aliphatic alcohol and non-reactive solvent. The basic salt is dissolved in a binary solvent system consisting of water and/or an aliphatic alcohol. The counterion of the basic salt is selected from the group consisting of antimony, iron, aluminum, lead and Groups IA, IIA, IB and IIB of the Periodic Table of Elements and mixtures thereof, as well as ammonium and amine counterions. The preferred cations include zinc, magnesium, sodium, lead, barium, calcium, and ammonium cations, wherein zinc, magnesium and sodium are the most preferred cations. The anion of the basic salt is selected from a carboxylic acid having from about 1 to about 4 carbon atoms, a hydroxide, or alkoxide and mixtures thereof. The preferred neutralizing agent is a metal acetate, more preferably sodium acetate. Sufficient metal salt of the carboxylic acid is added to the solution of the unneutralized sulfonated thermoplastic polymer to effect neutralization. It is preferable to neutralize at least 95 percent of the sulfonate groups, more preferably about 98 percent, most preferably 100 percent.

Examples of metal oxides useful in preparing metal sulfonates are $MgO$, $CaO$, $BaO$, $ZnO$, $Ag_2O$, $PbO_2$ and $Pb_3O_4$. Useful examples of metal hydroxides are NaOH, KOH, LiOH, $Mg(OH)_2$ and $Ba(OH)_2$.

In addition to the sulfonate/neutralization of polystyrene, an alternate approach to such polymers involves the copolymerization of sulfonate-containing styrene monomers with styrene to yield polymers having the appropriate levels of sulfonate groups. The copolymerization chemistry to obtain such material is similar to pending copolymerization applications U.S. Ser. Nos. 117,197; 117,198; and 117,199, all now abandoned, which are hereby incorporated by reference. The sulfonate-containing styrene polymers obtained via this approach are also effective in this invention.

A convenient way to introduce the sulfonated copolymer into the drilling mud is by means of a copolymer emulsion.

The amine-treated clays are typically formed by the treatment of clays with aliphatic amines or ammonium salts. The resulting products swell in organic liquids such as oil, and thus provide viscosity and suspension of solids.

The concentration of the amine-treated clay in the drilling mud formulation is about 1 to about 10 lb/bbl. of oil, more preferably about 3 to about 6 lb/bbl.

It has been observed that the sulfonated polymers formed by sulfonation often do not readily dissolve in hydrocarbons such as diesel oil or solvent 100 neutral and similar hydrocarbon solvents. The reason that these materials do not readily dissolve is due to the strong ionic interactions which persist in these sulfonated polymers.

It has been observed that the use of appropriate polar cosolvent can dramatically aid in the preparation of such solutions. The need for such cosolvents is most dramatically demonstrated with sulfonated polymers having sulfonate contents significantly above 15 meq. per 100 grams of the sulfonated polymer. Examples of such cosolvents are aliphatic alcohol hexanol, decanol and tridecyl alcohol employed at levels of from about 1 up to 20 parts by weight per 100 parts by weight of the oil employed in the drilling mud. The use of these cosolvents permits a more rapid dissolution process and a more complete solution from polymers which would normally be insoluble in a hydrocarbon diluent. It has also been observed at lower sulfonate levels, that is, 5 to 15 meq. or even higher per 100 grams of sulfonated polymer, that these polymers can be dissolved in the absence of such cosolvents. Cosolvents which are suitable in this invention have been described in U.S. application Ser. No. 930,044, now abandoned, which is herein incorporated by reference.

The polar cosolvent will have a solubility parameter of at least about 8.5, more preferably at least about 9.0 and may comprise from 0.1 to 40, preferably 0.5 to 20 weight percent, of the total mixture of organic liquid, ionomeric polymer and polar cosolvent. The solvent system of polar cosolvent and organic liquid, in which the neutralized sulfonated polymer is dissolved, contains less than about 15 weight percent of the polar cosolvent, more preferably about 2 to 10 weight percent, and most preferably about 2 to about 5 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of alcohols, amines, di- or trifunctional alcohols, amides, acetamides, phosphates, or lactones and mixtures thereof. Especially preferred polar cosolvents are aliphatic alcohols such as butanol, hexanol, octanol, decanol, dodecanol, tridecyl alcohol, 2-ethyl hexanol, etc.

DETAILED DESCRIPTION OF THE PREFERRED EMBODIMENT

Example 1

Emulsion Copolymerization of Isoprene and Sodium Styrene Sulfonate

A 250 ml. glass pressure bottle was charged with 1.6 g. sodium lauryl sulfate, 60 ml. distilled and deareated water, 25 g. of isoprene, 2.0 g. of sodium styrene sulfonate, 0.17 g. of dodecyl thiol and 0.1 g. of potassium persulfate. The bottle was sealed under nitrogen with a two-hole crown cap containing a rubber septum. The bottle was placed into a safety screen in a thermostated water shaker bath at 50° C. Shaking was immediately commenced. After an 8-hour reaction time, the bottle was removed and 3 ml. of a methanolic "shortstop" solution of 0.024 g. hydroquinone and 0.036 g. of a oxidation stabilizer 2,6-di-t-butyl-4-methylphenol (DBMP) was added via a syringe. The bottle was again shaken for an additional 10 minutes, cooled, and then opened. This emulsion was steamed to remove residual isoprene monomer. The copolymer emulsion was next added to a stirred solution of 0.15 g. DBMP of 500 ml. of methanol. Approximately 20 g. of NaCl was then added to coagulate the emulsion. The resulting white crumb was isolated by using an 80 mesh screen and a dental rubber dam. The copolymer was washed 3 times with 500 ml. of distilled water and finally rinsed with 200 ml. of methanol. The elastomeric white crumb was placed in a vacuum oven at 40° C. for overnight driving. This process yielded 21.71 g. (8.04%) of the polymer containing 0.56 wt. % sulfur which is equivalent to 1.22 mole % NaSS in the copolymer.

Example 2

The preparation of lightly sulfonated polystyrene as the free acid was conducted as follows: 1248 grams of a commercial polystyrene having a number average molecular weight of 110,000 was dissolved in 6.0 liters of 1,2-dichloroethane at 50° C. A clear homogeneous solution was obtained. The sulfonation was conducted by adding an appropriate amount of acetic anhydride and sulfuric acid to the polymer solution so as to achieve the desired level of sulfonation. Acetic anhydride was added (158.8 grams) and the sulfuric acid (99.1 grams) was dripped in slowly. The reaction mixture was stirred at 50° C. for 1 hour after all the sulfuric acid was added. The sulfonation reaction was then terminated by adding 150 ml. of methanol and the polymer recovered by vaporizing off the solvent in a large excess of boiling water. The resultant polymer mass was pulverized by adding an excess of water and subjecting the mixture to high speed shear in a laboratory blender. The resultant crumb was filtered. The water wet crumb was then dried in a laboratory fluid bed dryer at 170° to 190° F. Analysis of the final product gave a figure of 2.02 weight percent sulfur indicating 86% conversion of the sulfonation reagents. This sulfur level corresponds to a sulfonic acid content of 63.1 mmoles per 100 grams of polymer or about 6.9 mole percent sulfonic acid content.

Example 3

Oil based drilling muds were prepared using conventional laboratory methods. A typical mud was prepared by mixing 205.82 g. of No. 2 diesel oil, 34.76 g. Oil Faze (Magcobar), 1.5 g. SE11 and 1.5 g. DV33 (Magcobar). To this mixture was added 10 g. of $CaCl_2$ in 21 ml. of water. The mud was weighed with 226.35 g. of Barite and then 4.4 g. of additional $CaCl_2$ were added. The sodium salt of the sulfonated styrene (1.7 mol % sulfonate units) was added at a 2 lb/bbl. treat rate or 2.2 g. The amine-treated clay was added at a 3 lb/bbl treat rate. The mud was left overnight at room temperature to insure chemical equilibrium. Aliquots were aged at 150° F., 300° F. and 400° F. for 16 hours in pressurized cells. The cells were cooled to room temperature and then the rheological properties of the mud were measured on a Fann Model 35 viscometer at 115° F. The results for this test are shown in Table I, Column II.

TABLE I
RHEOLOGICAL COMPARISON OF OIL-BASED DRILLING MUDS

| | | Amine[1] Clay | SPS[b] Amine Clay | SPS[b] |
|---|---|---|---|---|
| R.T. | 600[c] | 43 | 79 | 36 |
| | 300[d] | 25 | 53 | 19 |
| | PV[e] | 18 | 26 | 17 |
| | YP[f] | 7 | 27 | 2 |
| | 0 Gel[g] | 4 | 13 | 2 |
| | 10 Gel[h] | 8 | 21 | 3 |
| 150° F. | 600 | 59 | 73 | 40 |
| | 300 | 36 | 47 | 21 |
| | PV | 23 | 26 | 19 |
| | YP | 13 | 21 | 2 |
| | 0 Gel | 6 | 10 | 2 |
| | 10 Gel | 10 | 15 | 4 |
| 400° F. | 600 | 56 | 71 | 55 |
| | 300 | 31 | 54 | 31 |
| | PV | 25 | 37 | 24 |
| | YP | 6 | 17 | 17 |
| | 0 Gel | 3 | 9 | 3 |
| | 10 Gel | 7 | 34 | 15 |

[a] = 4 lb/bbl.
[b] = 2 lb/bbl.
[c] = 600 rpm viscosity
[d] = 300 rpm viscosity
[e] = plastic viscosity
[f] = yield point
[g] = 0 gel strength
[h] = 10 min. gel strength

What is claimed is:
1. An oil-based drilling mud which comprises:
(a) an organic liquid immiscible with water;
(b) about 1 to about 10 parts by weight of water per 100 parts by weight of the organic liquid;
(c) about 20 to about 50 lb/bbl. of emulsifier;

(d) weighting material necessary to achieve the desired density;

(e) about 0.25 to about 4.0 lb/bbl. of water insoluble neutralized sulfonated thermoplastic polymer having about 5 to about 100 meq. of sulfonate groups per 100 grams of the neutralized sulfonated thermoplastic polymer; and (f) about 1 to about 10 lb/bbl. of an amine-treated clay.

2. A drilling mud according to claim 1 wherein the sulfonate groups of said neutralized sulfonated thermoplastic polymer are neutralized with a counterion selected from the group consisting of antimony, iron, aluminum, lead and Groups IA, IIA, IB and IIB of the Periodic Table of Elements.

3. A drilling mud according to claim 1 wherein the sulfonate groups of said neutralized sulfonated thermoplastic are neutralized with a counterion selected from the group consisting of zinc, magnesium and sodium.

4. A drilling mud according to claim 1 wherein the sulfonate groups of said neutralized sulfonated thermoplastic polymer are neutralized with zinc counterion.

5. A drilling mud according to claim 1 wherein said neutralized sulfonated thermoplastic polymer is derived from polystyrene.

6. A drilling mud according to claim 1 wherein said neutralized sulfonated thermoplastic polymer is a copolymer of styrene and sodium styrene sulfonate.

7. A drilling mud according to claim 1 wherein said neutralized sulfonated thermoplastic is derived from a polymer selected from the group consisting of polystyrene, poly-t-butyl-styrene, polychlorostyrene, polyalpha methyl styrene, polyvinyl toluene and co- or terpolymers of styrene with acrylonitrile, methyl methacrylate and butadiene.

8. A drilling mud according to claim 1 further including a wetting agent wherein said wetting agent is an alkylaryl sulfonate.

9. A drilling mud according to claim 1 wherein said weighting material is barite or barium sulfate.

10. A drilling mud according to claim 1 wherein the concentration level of said weighting material is sufficient to give said drilling mud a specific gravity of about 7 pounds per gallon to about 20 pounds per gallon.

11. A drilling mud according to claim 1 wherein said organic liquid is an oil.

12. A drilling mud according to claim 1 wherein said organic liquid is a diesel oil.

13. A drilling mud according to claim 1 wherein said organic liquid is a hydrocarbon solvent.

14. A drilling mud according to claim 1 wherein said emulsifier is a magnesium or calcium soap of a fatty acid.

15. A drilling mud according to claim 1 which further includes a polar cosolvent.

16. A drilling mud according to claim 1 wherein said water is salt water.

17. A drilling mud according to claim 1 wherein the concentration of said water is about 3 to about 5 parts by weight per 100 parts by weight of said organic liquid.

18. A drilling mud according to claim 1 wherein the sulfonate groups are neutralized in the mud formulation.

* * * * *